US012601864B2

(12) United States Patent
Ukuda

(10) Patent No.: US 12,601,864 B2
(45) Date of Patent: Apr. 14, 2026

(54) OPTICAL ELEMENT, OPTICAL EQUIPMENT, AND IMAGING APPARATUS

(71) Applicant: CANON KABUSHIKI KAISHA, Tokyo (JP)

(72) Inventor: Hideo Ukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 757 days.

(21) Appl. No.: 18/045,262

(22) Filed: Oct. 10, 2022

(65) Prior Publication Data

US 2023/0110024 A1 Apr. 13, 2023

(30) Foreign Application Priority Data

Oct. 13, 2021 (JP) .................................. 2021-168216

(51) Int. Cl.
| | |
|---|---|
| *G02B 5/18* | (2006.01) |
| *C08G 75/045* | (2016.01) |
| *G02B 1/04* | (2006.01) |
| *G02B 27/42* | (2006.01) |
| *H04N 23/50* | (2023.01) |

(52) U.S. Cl.
CPC ......... *G02B 5/1876* (2013.01); *C08G 75/045* (2013.01); *G02B 1/04* (2013.01); *G02B 5/1814* (2013.01); *G02B 5/1852* (2013.01); *G02B 27/4205* (2013.01); *H04N 23/50* (2023.01)

(58) Field of Classification Search
CPC ...... G02B 5/1852; G02B 1/04; G02B 5/1876; G02B 1/041; G02B 5/1866; G02B 27/4272; G02B 5/18; G02B 5/1895; G02B 5/1814; G02B 27/4205; G02B 3/08; C08K 3/22; B29D 11/00769; B29D 11/0073; C08G 75/045; H04N 23/50

See application file for complete search history.

(56) References Cited

U.S. PATENT DOCUMENTS

| | | |
|---|---|---|
| 2008/0107903 A1 | 5/2008 | Miyakawa et al. |
| 2008/0174871 A1 | 7/2008 | Ukuda et al. |
| | (Continued) | |

FOREIGN PATENT DOCUMENTS

| | | |
|---|---|---|
| JP | 2008203821 A | 9/2008 |
| JP | 2021085948 A | 6/2021 |
| | (Continued) | |

*Primary Examiner* — Matthew Y Lee

(74) *Attorney, Agent, or Firm* — Canon U.S.A., Inc. IP Division

(57) ABSTRACT

An optical element including a first optical layer, a second optical layer, and a transparent base material, the first optical layer being disposed between the second optical layer and the transparent base material and a diffraction grating being disposed at the interface between the first optical layer and the second optical layer, wherein the refractive index of the d-line of the second optical layer is higher than the refractive index of the d-line of the first optical layer, the Abbe number of the second optical layer is higher than the Abbe number of the first optical layer, the first optical layer is composed of a first resin and inorganic particles dispersed in the first optical layer, and the second optical layer is composed of a second resin having a modulus of elasticity of 0.1 GPa or more and 3.0 GPa or less at 22° C. or higher and 24° C. or lower.

13 Claims, 5 Drawing Sheets

(56) References Cited

U.S. PATENT DOCUMENTS

| | | | |
|---|---|---|---|
| 2009/0190224 A1* | 7/2009 | Iwasa | B29D 11/0073 |
| | | | 524/409 |
| 2013/0057956 A1* | 3/2013 | Iwasa | G02B 5/1895 |
| | | | 428/688 |
| 2013/0077170 A1* | 3/2013 | Ukuda | G02B 1/04 |
| | | | 359/566 |
| 2019/0127530 A1* | 5/2019 | Namiki | C08L 81/02 |
| 2019/0322857 A1* | 10/2019 | Kasuya | G03F 7/004 |
| 2020/0407546 A1* | 12/2020 | Nagai | C08K 3/22 |
| 2021/0157040 A1* | 5/2021 | Matsumoto | G02B 5/1842 |
| 2022/0403245 A1* | 12/2022 | Shiraiwa | C08F 2/44 |

FOREIGN PATENT DOCUMENTS

| | | | |
|---|---|---|---|
| WO | 2017179476 A1 | 10/2017 |
| WO | 2019177075 A1 | 9/2019 |
| WO | 2021172552 A1 | 9/2021 |

* cited by examiner

FIG. 3A
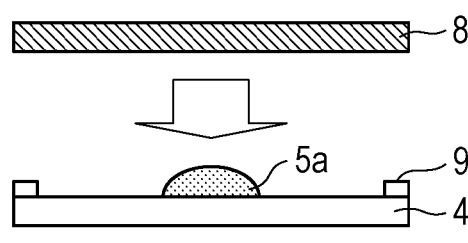
FIG. 3C
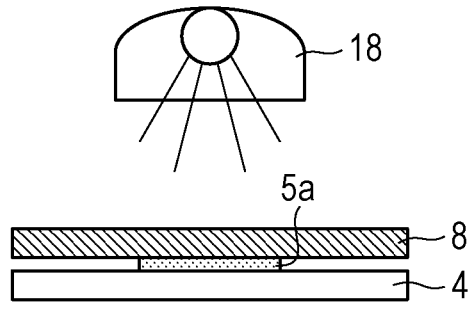
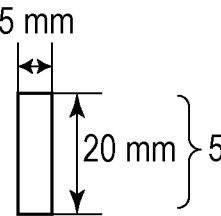
FIG. 3B
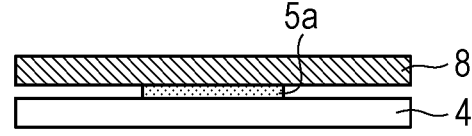

FIG. 4

| | | | EXAMPLE 1 | EXAMPLE 2 | EXAMPLE 3 | EXAMPLE 4 | COMPARATIVE EXAMPLE 1 |
|---|---|---|---|---|---|---|---|
| LOW-REFRACTIVE-INDEX AND HIGH-DISPERSION MATERIAL | OPTICAL CHARACTERISTICS | $n_d$ | 1.570 | 1.555 | 1.555 | 1.555 | 1.569 |
| | | $\nu_d$ | 19.1 | 24.1 | 24.1 | 24.1 | 19.3 |
| | | $\theta_{gF}$ | 0.41 | 0.44 | 0.44 | 0.44 | 0.41 |
| | MATERIAL SPECIES | FINE PARTICLE SPECIES | ITO | ITO | ITO | ITO | ITO |
| | | CONCENTRATION v% | 16.76 | 10.8 | 10.8 | 10.8 | 16 |
| | | RESIN | ACRYLIC | ACRYLIC | ACRYLIC | ACRYLIC | ACRYLIC |
| HIGH-REFRACTIVE-INDEX AND LOW-DISPERSION MATERIAL | OPTICAL CHARACTERISTICS | $n_d$ | 1.615 | 1.584 | 1.584 | 1.584 | 1.619 |
| | | $\nu_d$ | 39.6 | 42.4 | 42.4 | 42.4 | 45.0 |
| | | $\theta_{gF}$ | 0.59 | 0.58 | 0.58 | 0.58 | 0.57 |
| | MATERIAL SPECIES | FINE PARTICLE SPECIES | | | | | ZrO$_2$ |
| | | CONCENTRATION v% | | | | | 17.0 |
| | | RESIN | ENE-THIOL-BASED | ENE-THIOL-BASED | ENE-THIOL-BASED | ENE-THIOL-BASED | ACRYLIC |
| | PHYSICAL PROPERTY | MODULUS OF ELASTICITY (GPa) | 1.8 | 2.5 | 2.7 | 3 | 4 |
| REFRACTIVE INDEX DIFFERENCE | | | 0.045 | 0.029 | 0.029 | 0.029 | 0.050 |
| DIFFRACTION GRATING CHARACTERISTICS | | LENGTH L1 (μm) | 12.85 | 20 | 20 | 20 | 10.2 |
| | | DIFFRACTION EFFICIENCY | >99.6% | >99.5% | >99.5% | >99.5% | >99.8% |
| | | PHASE DIFFERENCE NEAR CENTER (nm) | 15 | 30 | 35 | 40 | 60 |

OPTICAL ELEMENT, OPTICAL EQUIPMENT, AND IMAGING APPARATUS

BACKGROUND OF THE INVENTION

Field of the Invention

The present disclosure relates to an optical element.

Description of the Related Art

When white light passes through a lens, chromatic aberration occurs due to the refractive indices of colors differing from each other. Regarding a diffractive optical system, a known technology reduces chromatic aberration and improves a diffraction efficiency by stacking resins formed of materials having different dispersion characteristics.

For example, Japanese Patent Laid-Open No. 2008-203821 proposes a diffractive optical element formed by stacking a high-refraction and low-dispersion material in which the surface has a diffraction grating shape and in which zirconia fine particles serving as inorganic fine particles are dispersed in an organic resin and a low-refraction and high-dispersion material in which the surface has a diffraction grating shape and in which ITO fine particles serving as inorganic fine particles are dispersed in an organic resin.

The thickness of a low-refractive-index and high-dispersion material is not uniform due to the surface having a diffraction grating shape.

Consequently, gaps are generated in the film thickness of the high-refractive-index and low-dispersion material. Since the amount of shrinkage during curing differs in accordance with the film thickness, strain is generated in the high-refractive-index and low-dispersion material, and as a result, residual stress is generated. The residual stress tends to increase in relation to the modulus of elasticity of the high-refractive-index and low-dispersion material.

In general, the high-refractive-index and low-dispersion material in which inorganic fine particles are dispersed has a high modulus of elasticity so that excessive residual stress is generated and refractive index variations occur in the interior of the high-refractive-index and low-dispersion material. When light is incident on the high-refractive-index and low-dispersion material in which refractive-index variations occurred, a phase difference is generated relative to when light is incident on the high-refractive-index and low-dispersion material in which no refractive-index variations occurred, and in the de-focusing state, ring variations in which the concentration increases in relation to the phase difference may occur.

SUMMARY OF THE INVENTION

In this regard, the present disclosure provides a lamination type optical element, optical equipment, or the like in which refractive index variations are reduced.

A measure for addressing the above-described disadvantages features an optical element including a first optical layer, a second optical layer, and a transparent base material, the first optical layer being disposed between the second optical layer and the transparent base material and a diffraction grating being disposed at the interface between the first optical layer and the second optical layer, wherein the refractive index of the d-line of the second optical layer is higher than the refractive index of the d-line of the first optical layer, the Abbe number of the second optical layer is higher than the Abbe number of the first optical layer, the first optical layer is composed of a first resin and inorganic particles dispersed in the interior of the first optical layer, and the second optical layer is composed of a second resin having a modulus of elasticity of 0.1 GPa or more and 3.0 GPa or less at 22° C. or higher and 24° C. or lower.

Further features of the present disclosure will become apparent from the following description of exemplary embodiments with reference to the attached drawings.

BRIEF DESCRIPTION OF THE DRAWINGS

FIGS. 3A to 3C are schematic diagrams illustrating a method for manufacturing an evaluation sample of the example.

FIG. 4 is a table presenting the evaluation results of the examples and the comparative example.

DESCRIPTION OF THE EMBODIMENTS

A form for realizing the present disclosure will be described below with reference to the drawings. However, the form described below is an embodiment of the present disclosure, and the present disclosure is not limited to this. In this regard, a common configuration is described mutually referring to a plurality of drawings, and explanations of configurations indicated by the same reference may be appropriately omitted. Different items having the same name will be distinguished by being modified with the respective "ordinal numbers" such as a first item and a second item.

First Embodiment

Figure 1:
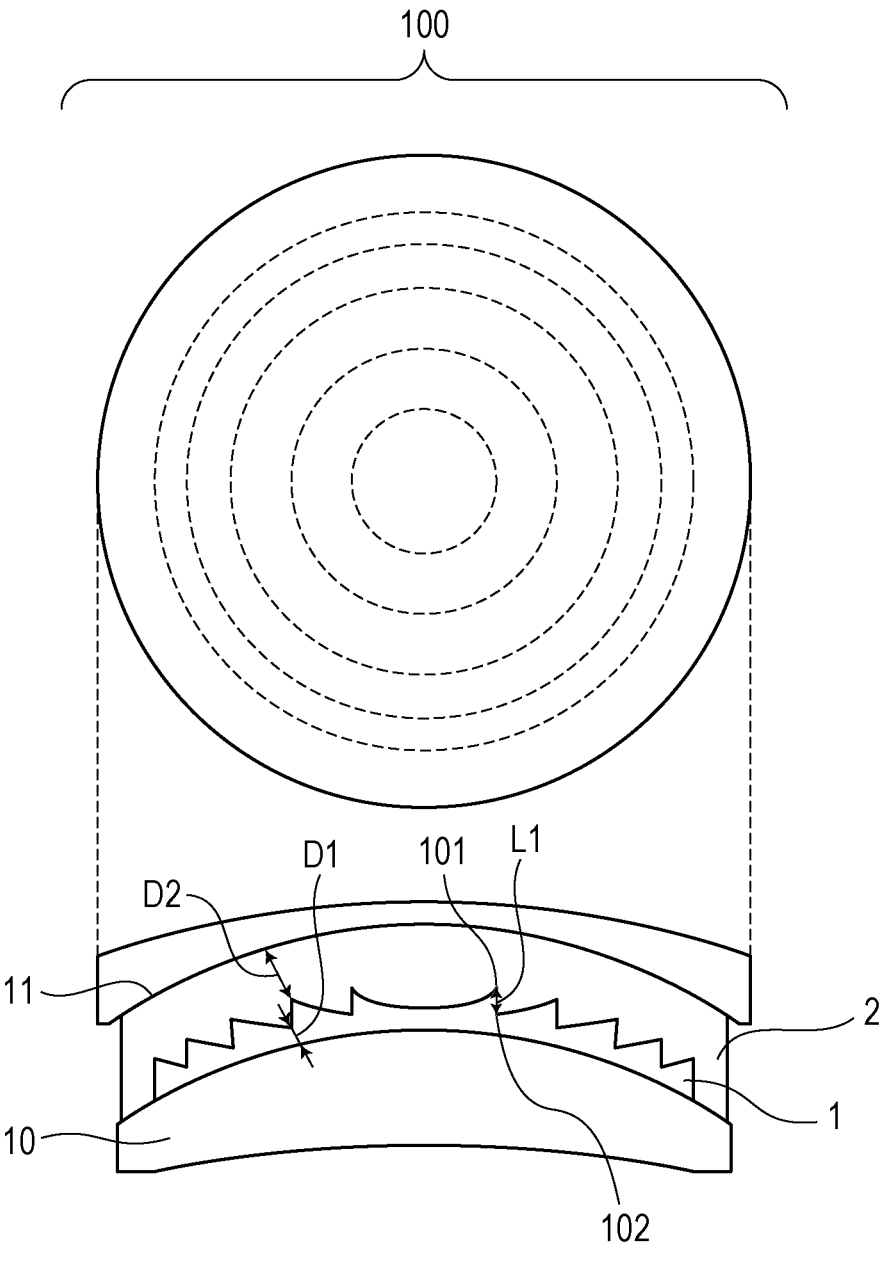
FIG. 1 is a top view and a side view illustrating an optical element according to the present embodiment.

FIG. 1 is a top view and a side view illustrating an optical element 100 according to the present embodiment.

The optical element 100 is composed of a base material 10, a resin portion 1 disposed on the base material 10, a resin portion 2 disposed on the resin portion 1, and a base material 11 disposed on the resin portion 2. Herein, the base materials 10 and 11 are base materials that are transparent and that pass light in the visible light region. The optical element 100 is, for example, a diffractive optical element. The base material 10, the resin portion 1, the resin portion 2, and the base material 11 are stacked in this order. The resin portion 1 adheres to the resin portion 2, and a diffraction grating is disposed at the interface between the resin portion 1 and the resin portion 2. The resin portion 1 is, for example, a first optical layer, and the resin portion 2 is, for example, a second optical layer.

The refractive index of the resin portion 1 at a wavelength is nA, and the refractive index of the resin portion 2 at the same wavelength is nB. In the present instance, nA is smaller than nB (nA<nB). The comparison is performed typically at a wavelength of the d-line (587.6 nm), but the wavelengths of the c-line, the g-line, or the like may be adopted. The refractive index nA of the d-line is, for example, 1.54 or more and 1.58 or less, and the refractive index nB of the d-line is, for example, 1.57 or more and 1.63 or less. The difference between the refractive index nA of the d-line and the refractive index nB of the d-line is 0.027 or more and 0.047 or less.

The Abbe number of the resin portion 1 is νA, and the Abbe number of the resin portion 2 is νB. In the present instance, νA is smaller than νB (νA<νB). The Abbe number νA is, for example, 19 or more and 28 or less, and the Abbe number νB is, for example, 38 or more and 43 or less. Herein, $ν_d$ is adopted as an example of the Abbe number, but $ν_c$ or $ν_g$ rather than $ν_d$ may be adopted.

When the refractive index and the Abbe number do not satisfy the above-described ranges, the height of the diffraction grating described later is fluctuated, and there is a concern that refractive index variations may tend to occur in accordance with changes in the surrounding environment such as temperature.

The resin portion 1 will be described below in detail. The resin portion 1 is composed of a resin 1a and inorganic particles, and regarding the resin 1a and a resin 2a constituting the resin portion 2, the refractive index, the Abbe number, and secondary dispersion are designed so that the optical element 100 obtains predetermined optical characteristics. The resin portion 1 contains inorganic particles surface-treated with a dispersing agent and the curable resin 1a. The resin 1a and the resin 2a may be a first resin and a second resin, respectively.

In this regard, the resin may be a polymer, an organic resin, or the like, which partly contains an inorganic component such as silicone.

The refractive index of the resin portion 1 is lower than the refractive index of the resin portion 2, and the Abbe number of the resin portion 1 is lower than the Abbe number of the resin portion 2.

In this regard, the Abbe number and the secondary dispersion are indicators representing the gradient of the refractive index in the visible light region (wavelength: 435.8 nm to 656.3 nm) and are calculated based on Formulae (1) and (2) below.

$$\text{Abbe number} \, ν_d = (n_d - 1)/(n_F - n_c) \tag{1}$$

$$\text{secondary dispersion} \, θ_{gF} = (n_F - 1)/(n_F - n_c) \tag{2}$$

$n_g$: g-line (435.8 nm) refractive index
$n_F$: F-line (486.1 nm) refractive index
$n_d$: d-line (587.6 nm) refractive index
$n_c$: c-line (656.3 nm) refractive index In this regard, the Abbe number $ν_d$ represents the gradient of $n_d$ in the range of $n_c$ to $n_F$, and any refractive index range is selected. When nA<nB with respect to the d-line, the Abbe number can be $ν_d$, but the Abbe number may be $ν_c$ or $ν_g$. To realize high refractive index and low dispersion, the resin 2a constituting the resin portion 2 is an ene-thiol-based resin containing a thiol compound and a (meth)acrylate compound. The resin 2a is obtained by curing an uncured resin composition containing a thiol compound monomer and/or an oligomer thereof and a (meth)acrylate-based monomer and/or an oligomer thereof. The resin 2a is an energy-curable resin. The energy-curable resin denotes a resin which is cured from an uncured state by being provided with light energy and/or thermal energy.

Examples of the thiol compound contained in the resin 2a used for forming the resin portion 2 include 4-mercaptomethyl-3,6-dithia-1,8-octanedithiol, 4-mercaptomethyl-1,8-dimercapto-3,6-dithiaoctane (4-mercaptomethyl-3,6-dithia-1,8-octanedithiol), 4,8-bis(mercaptomethyl)-1,11-dimercapto-3,6,9-trithiaundecane (4,8-dimercaptomethyl-1,11-dimercapto-3,6,9-trithiaundecane), and 5,7-bis (mercaptomethyl)-1,11-dimercapto-3,6,9-trithiaundecane (5,7-dimercaptomethyl-1,11-dimercapto-3,6,9-trithiaundecane).

Examples of the (meth)acrylate compound contained in the resin 2a used for forming the resin portion 2 include tris(2-acryloxyethyl) isocyanurate, oligoethylene glycol di(meth)acrylate, dimethyloltricyclodecane di(meth)acrylate, trimethylolpropane tri(meth)acrylate, pentaerythritol tetra(meth)acrylate, and dipentaerythritol hexa(meth)acrylate.

The proportion of the thiol compound in the resin 2a can be within the range of 30% by mass or more and 80% by mass or less. When the thiol compound content is within the above-described range, the optical characteristics and the formability are favorable. When the thiol compound content is less than 30% by mass, there is a concern that the refractive index may be unable to increase. On the other hand, when the thiol compound content is more than 80% by mass, there is a concern that the formability during formation of the resin portion 2 may be insufficient.

The resin 2a used for forming the resin portion 2 contains a polymerization initiator. The polymerization initiator may be a photopolymerization initiator or a thermal polymerization initiator and determined in accordance with a selected production process. However, in an instance in which replica forming that is easy-to-produce a diffraction grating shape is performed, a photopolymerization initiator can be contained. Examples of the photopolymerization initiator include 2-benzyl-2-dimethylamino-1-(4-morphorinophenyl)-1-butanone, 1-hydroxy-cyclohexyl-phenyl-ketone, bis(2,4,6-trimethylbenzoyl)-phenylphosphine oxide, 4-phenyl-benzophenone, 4-phenoxybenzophenone, 4,4'-diphenylbenzophenone, and 4,4'-diphenoxybenzophenone. From the viewpoint of favorable transparency of the resin portion 2, 1-hydroxy-cyclohexyl-phenyl-ketone can be adopted.

The photopolymerization initiator content can be within the range of 0.01% by mass or more and 10% by mass or less relative to the entire resin 2a. One type of photopolymerization initiator may be used alone, or at least two types may be used in combination in accordance with the reactivity with an oligomer and the like and a wavelength applied during photo-curing.

The resin portion 2 having the above-described configuration enables the material to have a modulus of elasticity of 0.1 GPa or more and 3.0 GPa or less at 22° C. or higher and 24° C. or lower and to exhibit high refractive index and low dispersion relative to the resin portion 1. It is more favorable that the modulus of elasticity be 0.1 GPa or more and 2.5 GPa or less. When the modulus of elasticity is less than 0.1 GPa, temperature dependency of the refractive index increases, and predetermined optical characteristics are not limited to being obtained. When the modulus of elasticity is more than 3.0 GPa, it is difficult to reduce refractive index variations of the optical element 100. When light is incident on the resin portion 2 in which refractive index variations occurred, a phase difference relative to when light is incident on the resin portion 2 with no refractive index variations is caused. In the de-focusing state, ring variations in which concentration increases in relation to the phase difference occur.

In this regard, "22° C. or higher and 24° C. or lower" denotes that at least one point at or about 23° C. has to satisfy the above-described modulus of elasticity range, and it is not necessary that the above-described modulus of elasticity range is satisfied throughout 22° C. or higher and 24° C. or lower.

Setting the modulus of elasticity of the resin portion 2 to be within the above-described range enables the residual stress generated during curing of the resin 2a to be reduced and enables refractive index variations in the interior of the resin portion 2 to be reduced. Reducing refractive index variations enables a phase difference to be reduced and enables the concentration of ring variations in the defocusing state to be reduced.

The thickness D2 of the resin portion 2, that is, the distance from the grating apex 101 of the resin portion 1 to the base material 11, is preferably 20 μm or more and 80 μm or less and more preferably 30 μm or more and 70 μm or less.

Next, the resin 1a contained in the resin portion 1 will be described. The resin 1a is a resin that is a liquid at room temperature and is cured on the basis of a radical generation mechanism by utilizing a polymerization initiator such as a photopolymerization initiator or a thermal polymerization initiator. Consequently, the resin 1a according to the present embodiment is favorably used for replica formation of an optical element such as a lens.

The resin 1a contained in the resin portion 1 according to the present embodiment is a curable resin and obtained by curing an uncured resin. Examples of the resin 1a include acrylic resins, methacrylic resins, vinyl-based resins, and epoxy-based resins, but the resin 1a is not limited to these. One type of the resin 1a may be used alone, or at least two types may be used in combination. In this regard, acrylic resins can be adopted from the viewpoint of excellent optical characteristics. Regarding the acrylic resin, a monomer or an oligomer of a compound having a polymerizable reactive group such as an acrylate group or a methacrylate group are usable. The monomer or the oligomer can be favorably compatible with a solvent or a dispersing agent in which metal oxide particles are dispersed. There is no particular limitation regarding the type of the monomer provided that the monomer is an unsaturated-group-containing compound having at least one double bond or triple bond in the molecule. Specific examples of the monomer or the oligomer of an unsaturated-group-containing compound include 1,4-divinylcyclohexane, 1,4-cyclohexanedimethanol divinyl ether, 4,4-dimethyl-hept-1-ene-6-yne, divinylbenzene, 1,6-divinylnaphthalene, N-vinylpyrrolidone, N-vinylcaprolactam, ethoxylated bisphenol A divinyl ether, propoxylated bisphenol A divinyl ether, monofunctional acrylates or methacrylates, such as polyethylene glycol mono(meth)acrylate, polypropylene glycol mono(meth)acrylate, and phenoxyethyl (meth)acrylate; polyethylene glycol di(meth)acrylate, polypropylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol hexa(meth)acrylate, hexanediol di(meth)acrylate, and tri(acryloyloxyethyl) isocyanurate.

In this regard, the monomer content is 25% by volume or more and 90% by volume or less relative to the resin portion 1. The resin portion 1 satisfying the range of the dispersing agent content described later and the above-described range of the monomer content enables light scattering to become hard to occur and enables volume expansion due to moisture absorption of the cured resin composition to be reduced. This is because, in the resin 1a, the metal oxide particles being favorably dispersed due to the dispersing agent and the monomer functioning as a cross-linking component enable volume expansion to be suppressed from occurring. On the other hand, when the monomer content is less than 25% by volume, the formability is deteriorated. When the monomer content is more than 90% by volume relative to the resin portion 1, the metal oxide particle content is relatively decreased, and sufficient optical characteristics are not obtained.

The inorganic particles composed of the metal oxide contained in the resin portion 1 will be described below.

In the resin portion 1 according to the present embodiment, the inorganic particles play a role in adjusting wavelength dispersion of the refractive index of the resin 1a.

From the viewpoint of exerting no influence on light scattering and transmission performance, the average primary particle diameter of the metal oxide particles can be 3 nm or more and 20 nm or less. When the particle diameter is more than 20 nm, the particle including an aggregate, there is a concern that light scattering may be significantly increased. On the other hand, when the particle diameter is less than 3 nm, since the surface energy of the particle increases so that reaggregation proceeds, there is a concern that dispersion may become hard to occur.

In this regard, when a particle having a particle diameter of more than 20 nm is present in the resin portion 1, the particle having such a particle diameter is removable by a step of centrifugal treatment, ultrafiltration, or the like. Removal of the particle can be performed after a solvent is removed while the particle is in the state of being dispersed in the solvent (particle dispersion liquid).

Examples of the method for measuring the average primary particle diameter (number average particle diameter of primary particles) of the inorganic particles include a dynamic light scattering method. A particle size distribution analyzer is an apparatus suitable for the measurement, and examples of the apparatus include ELSZ-2000ZS (produced by OTSUKA ELECTRONICS CO., LTD.).

The inorganic particle content can be 1% by volume or more and 29% by volume or less relative to the resin portion 1. When the inorganic particle content is within the above-described range, the resin portion 1 has low viscosity and excellent processability.

The resin 1a is made into a cured material having optical characteristics of a high refractive index and high transparency. However, when the inorganic particle content is less than 1% by volume relative to the resin portion 1, regarding the cured material of the resin 1a, there is a concern that a scattering rate may be increased and the transparency may become insufficient. When the inorganic particle content is more than 29% by volume, there is a concern that the viscosity of the resin portion 1 may be increased and the formability may be deteriorated.

Regarding the type of the inorganic particle, various metal oxides are usable in accordance with predetermined optical characteristics. Examples of the usable particle include silicon oxide ($SiO_2$), titanium oxide ($TiO_2$), strontium titanate ($SrTiO_3$), zirconium oxide ($ZrO_2$), and hafnium oxide ($HfO_2$). In addition, examples include aluminum oxide ($Al_2O_3$), indium oxide ($In_2O_3$), tin oxide ($SnO_2$), indium tin oxide (ITO), antimony-doped tin oxide (ATO), and zinc oxide (ZnO). To increase wavelength dispersion and decrease the Abbe number $\nu_d$, titanium oxide or strontium titanate is used. Further, to increase the diffraction efficiency in the visible light region of the optical element, a transparent electroconductive substance is used.

Specific examples of the substance include indium oxide, tin oxide, indium tin oxide, antimony-doped tin oxide, and zinc oxide, and indium tin compounds can be adopted.

Since the optical characteristics for accurately realizing the diffraction efficiency in the visible light region (linear dispersion characteristics) is in accordance with a carrier (electron, hole, or the like) that exhibits electrical conductivity, an electroconductive substance can be used.

Organic fine particles are unfavorable since the transparency is deteriorated compared with the inorganic particles.

It is desirable that the inorganic particles be subjected to surface treatment as the situation demands. The surface treatment may be performed at the stage of synthesizing or producing fine particles or may be separately performed after the fine particles are obtained.

In this regard, it is desirable that a surface treatment agent for uniformly dispersing the inorganic particles without aggregation, for example, a dispersing agent such as a surfactant, be used.

Regarding the surface treatment agent and dispersing agent used in the present embodiment, derivatives of pigments and resin-type or activator-type agents are suitable for use. Herein, regarding the surface treatment agent and the dispersing agent, cationic, weak cationic, nonionic, or amphoteric surfactants are effective. In particular, polyester-based agents, ε-caprolactone-based agents, polycarboxylates, polyphosphates, hydrostearates, amidosulfates, polyacrylates, olefin-maleate copolymers, acryl-maleate copolymers, alkylamineacetates, alkyl fatty acid salts, fatty acid polyethylene glycol ester based agents, silicone-based agents, and fluorine-based agents may be used. In the present embodiment, at least one basic agent selected from ammonia and organic amines is suitable for use. Specific examples include DISPERBYK 161, 162, 163, and 164 of DISPERBYK Series (produced by BYK Japan KK), Solsperse 3000, 9000, 17000, 20000, 24000, and 41090 of Solsperse Series (produced by Zenega), and PO or EO modified products of alkylamines such as TAMN-15 of TAMN Series (produced by Nikko Chemicals Co., Ltd.).

It is desirable that the amount of the surface treatment agent or the dispersing agent added be within the range of 0.1% by weight or more and 35.0% by weight or less relative to the weight of the fine particles. When the amount of dispersing agent added is excessive, white turbidity is caused so that optical scattering occurs, and the characteristics (the refractive index, the Abbe number, the secondary dispersion characteristics, the modulus of elasticity, and the like) of the composition obtained containing fine particles are deteriorated more than necessary. The amount is preferably within the range of 4.0% by weight or more and 25.0% by weight or less. In this regard, one type of the surface treatment agent or the dispersing agent may be used alone, or at least two types may be used in combination.

The polymerization initiator used for the resin portion 1 may be akin to or differ from that used for the resin portion 2. The polymerization initiator may be appropriately selected in accordance with the curing condition (irradiation wavelength and dosage) for the curable resin.

A method for manufacturing the resin portion 1 will be described.

Initially, a dispersing agent is added to inorganic particles not subjected to the surface treatment, and treatment of making the dispersing agent to adsorb to the surfaces of the inorganic particles is performed.

Specifically, electroconductive fine particles such as ITO or AZO may be used as the inorganic particles. For example, xylene or toluene may be used as a solvent of a dispersion solution. Regarding the treatment of making the dispersing agent to adsorb to the surfaces, an aggregate is disintegrated using a beads mill or the like, and the dispersing agent adsorbs to exposed surfaces so as to stabilize the primary particle diameter. The necessary amount is calculated from the particle concentration in the dispersion solution, and a photopolymerizable monomer or oligomer and a photopolymerization initiator are dissolved.

In this regard, filtering treatment may be performed, as the situation demands, so as to remove aggregated particles. After it is ascertained that particles are favorably dispersed without precipitation and the like, the solvent is removed using, for example, an evaporator. In such an instance, the degree of decompression can be appropriately adjusted in accordance with the boiling point of the solvent, the amount of residual solvent, and the like. Rapid vaporization and removal of the solvent may make the degree of aggregation of particles worse so that the dispersibility may be impaired. During solvent removal due to decompression, it is possible to heat to the extent that does not impair the dispersibility, as the situation demands.

The resin portion 1 according to the present embodiment is obtained through the above-described steps.

The resulting resin portion 1 may contain a residual solvent which has not been removed. When the residual solvent content is more than 0.1% by mass, there is a concern that the refractive index gradient (GI) and light scattering may increase during photo-curing due to a function of facilitating particle movement. Therefore, the residual solvent content can be 0.1% by mass or less.

The thickness D1 of the resin portion 1, that is, a distance from a grating apex 101 or a grating valley 102 to the base material 10 is preferably 1 μm or more and 30 μm or less and more preferably 2 μm or more and 25 μm or less. When the resin portion 1 is thinner than 1 μm, the optical characteristics of the optical element 100 are deteriorated, and when the resin portion 1 is thicker than 30 μm, there is a concern that the transparency of the optical element 100 may be deteriorated. In the present embodiment, the thickness D1 is smaller than the thickness D2. It is more favorable that a distance from the grating valley 102 to the base material 10 be within the above-described range.

The length L1 from the grating valley 102 of the resin portion 1 to the grating apex 101 can be 5 μm or more and 25 μm or less. The length L1 is a length from the grating apex 101 to the grating valley 102, and at least one in the optical element 100 has to satisfy the above-described range. Designing the thickness D1 of the resin portion 1, the thickness D2 of the resin portion 2, and the length L1 to be within the above-described ranges enables the optical element 100 having a high diffraction efficiency to be obtained.

A method for manufacturing the optical element 100 will be described below.

FIGS. 2A to 2E are schematic diagrams illustrating the method for manufacturing the optical element 100 according to the present embodiment. The steps of producing the optical element 100 will be described below with reference to FIGS. 2A to 2E. In FIGS. 2A to 2E, the same elements as those in FIG. 1 are indicated by the same references as in FIG. 1.

Initially, an appropriate amount of uncured resin 1a is introduced between a mold 12 having a shape of an inverted predetermined diffraction grating shape and the base material 10. The resin 1a is designed to become high refractive index and low dispersion relative to the resin portion 2 after curing. Herein, the base material 10 and the mold 12 are held by a mold-release jig 15.

Next, the mold 12 and the base material 10 are moved so as to extend the uncured resin 1a until a predetermined thickness is obtained and the outside of the optically effective portion is covered. As the situation demands, the mold 12 and/or the base material 10 may be pressurized or heated during the introduction.

Subsequently, light or thermal energy is applied to the introduced uncured resin 1a so as to perform curing.

Figure 2A:
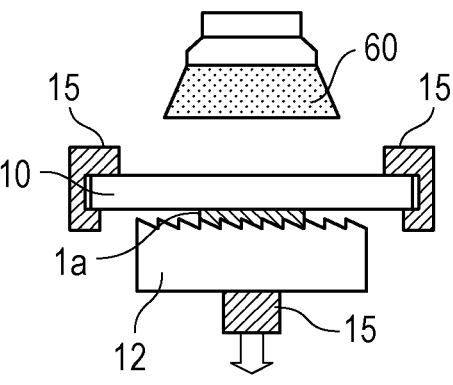
FIGS. 2A to 2E are schematic diagrams illustrating a method for manufacturing an optical element.

In FIG. 2A, light energy is applied by an ultraviolet light source 60. In such an instance, to accelerate a curing reaction of the uncured resin 1a, not only the light but also heat may be applied.

Figure 2C:
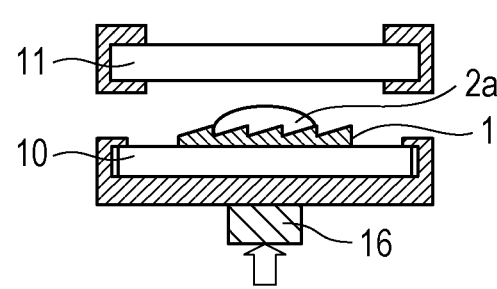
Figure 2B:
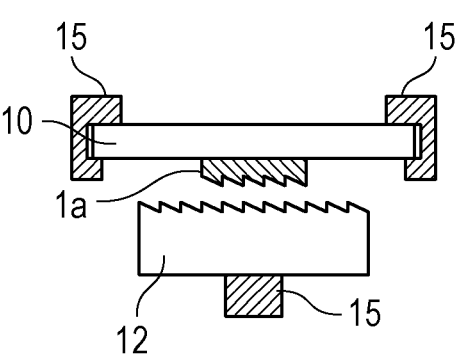

Thereafter, as illustrated in FIG. 2B, the mold-release jig 15 is moved so as to release the mold 12 and form the resin portion 1 that is composed of a cured material of the resin 1a and that has a diffraction grating shape.

Further, as illustrated in FIG. 2C, the base material 10 provided with the resin portion 1 is held by a forming jig 16. Subsequently, an appropriate amount of an uncured resin 2a is introduced between the diffraction grating shape of the resin portion 1 and the base material 11. In this regard, for the purpose of forming the resin portion 2, a mold different from the mold 12 may be used instead of the base material 11.

Figure 2D:
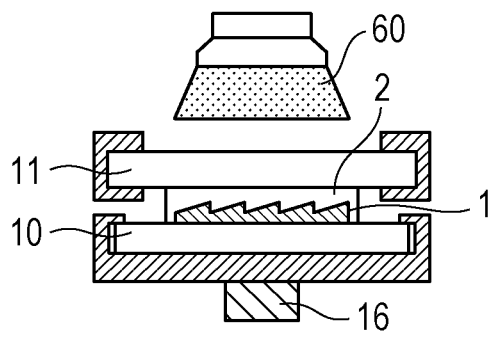
Figure 2E:
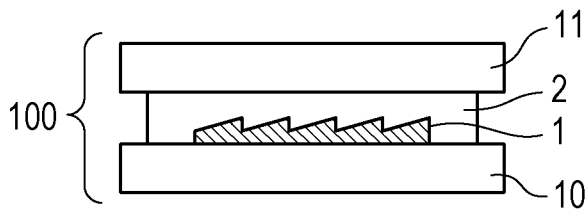
Figure 5:
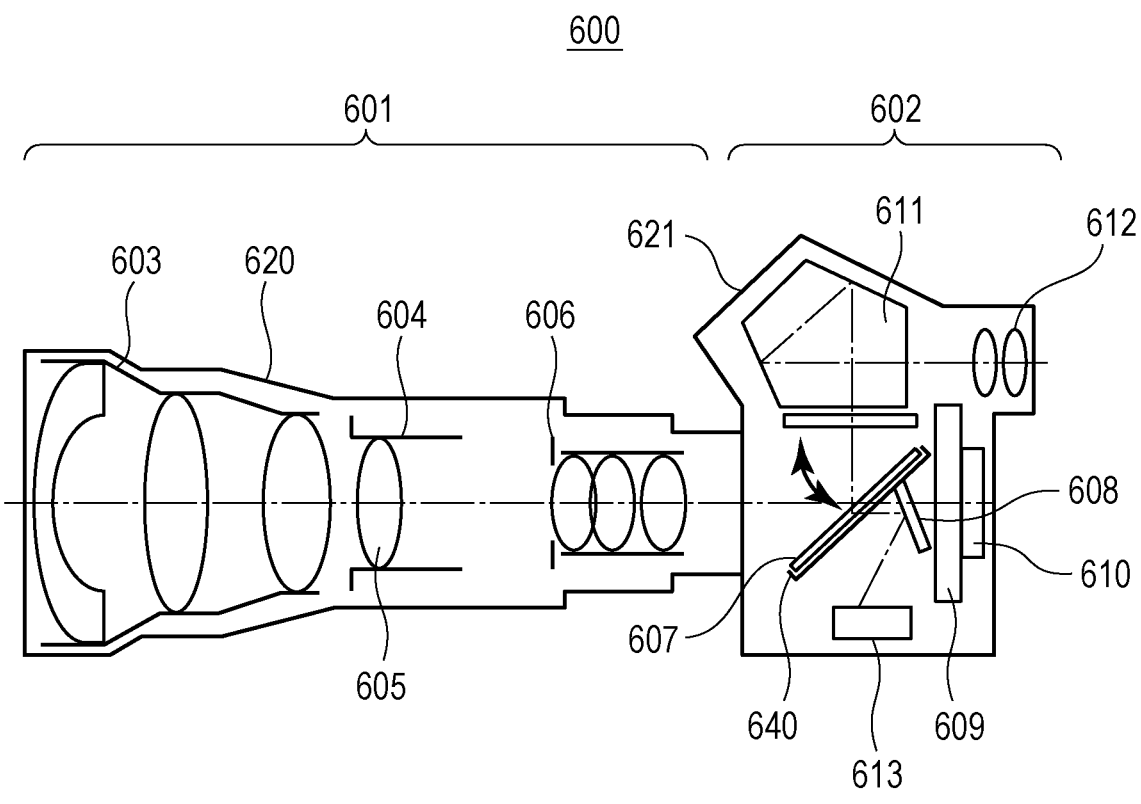
FIG. 5 is an explanatory diagram illustrating an imaging apparatus as an example of an apparatus including an optical element according to an embodiment.

As illustrated in FIG. 2D, the uncured resin 2a is extended until a predetermined thickness is obtained and the inside and the outside of the optically effective portion are covered. Further, light or thermal energy is applied from a light source 60 to the introduced uncured resin 2a so as to cure and form the resin portion 2 that is composed of a cured material of the resin 2a and that has a diffraction grating shape.

In this regard, the base material 11 may be separated after the resin portion 2 is formed.

The pitch between gratings of the formed diffraction grating shape increases with increasing proximity to the center of the optical element 100 and decreases with increasing proximity to the radial direction edge portion of the optical element 100. The pitch between gratings is a distance from a grating apex 101 to a grating apex that is nearest the grating apex 101 and that adjoins the grating apex 101 or a distance from a grating valley 102 to a grating valley that is nearest the grating valley 102 and that adjoins the grating valley 102.

The optical element 100 may be produced through the above-described steps.

EXAMPLES

The resins 1a and 2a and the optical element 100 according to the present embodiment will be specifically described below. To begin with, the method for evaluating the optical element according to the present embodiment will be described.

Regarding the resin portion 1 and the resin portion 2 of the optical element 100 of each of the examples and the optical element of the comparative example, an optical characteristics evaluation sample was formed, and the refractive index and the Abbe number were evaluated. In this regard, it is also possible to peeling the base material off the optical element and to remove and evaluate the resin without using the optical characteristics evaluation sample. Initially, the method for producing the optical characteristics evaluation sample will be described.

As illustrated in FIG. 3A, a spacer 9 having a thickness of 12.5 μm in an instance of the resin portion 1 or a thickness of 50 μm in an instance of the resin portion 2 and an uncured resin 5a that was a raw material for a resin serving as a measurement objective were placed on a glass 4 (S-TIH11) having a thickness of 1 mm. A quartz glass 8 having a thickness of 1 mm was placed thereon with the spacer 9 interposed therebetween so as to extend the uncured resin 5a.

Subsequently, as illustrated in FIG. 3B, the spacer 9 was removed. Thereafter, as illustrated in FIG. 3C, light was applied using a high-pressure mercury lamp (UL750: produced by HOYA CANDEO OPTRONICS) serving as a light source 18 from above the quartz glass 8 under the condition of 20 mW/cm$^2$ (=illuminance through the quartz glass) for 2500 sec (50 J). After the resin 5a was cured and the quartz glass was peeled, annealing was performed at 80° C. for 16 hours so as to obtain the optical characteristics evaluation sample. The shape of the cured resin 5 had a thickness of 500 μm and a size in a glass plane of 5 mm×20 mm.

The resulting sample was subjected to a refractive index measurement from the glass 4 side at each wavelength of the g-line (435.8 nm), the F-line (486.1 nm), the d-line (587.6 nm), and the c-line (656.3 nm) by using a refractometer (KPR-30 produced by SHIMADZU CORPORATION).

The Abbe number was calculated from the resulting refractive index at each wavelength. The Abbe number ν was calculated on the basis of Formula (1) above.

Evaluation of Diffraction Efficiency.

The diffraction efficiency of the optical element of each of the examples and the comparative example was measured by using an automatic optical element measuring apparatus (ASP-32: produced by Bunkoukeiki Co., Ltd.). Initially, arbitrary spot light was applied to the optical element, and the amount of the transmitted light was measured. Subsequently, the amount of the first-order diffracted light, which was the design order, was measured, and the ratio, expressed in a percentage, of the amount of light of the design order to the total amount of the transmitted light was assumed to be the diffraction efficiency.

Evaluation of Transmitted Wavefront

Regarding the optical element, a shift of the phase near the center ring was examined using a laser interferometer. When the shift is an integral multiple of the wavelength, the result is 0 nm.

Example 1

The resin 1a was prepared as described below.

Mixing of 52.74 g of fine particle dispersion liquid in which an indium tin oxide (ITO) was dispersed in a xylene solvent (average particle diameter of 15 nm, indium tin oxide concentration of 9.90% by weight, amount of dispersing agent of 2.07% by weight, and dispersing agent species: [high-molecular-weight dispersing agent] produced by CIK NanoTek Corporation) and 3.69 g of mixture of 20% by weight of tris(2-acryloxyethyl) isocyanurate, 25% by weight of pentaerythritol triacrylate, 40% by weight of dicyclopentenyloxyethyl methacrylate, 13% by weight of urethane-modified polyester acrylate, and 2% by weight of 1-hydroxycyclohexyl phenyl ketone, serving as an ultraviolet-curable acrylic resin, was performed.

Regarding the particle diameter, the fine particle dispersion liquid was subjected to a measurement by using a laser type particle size distribution analyzer (ELS: OTSUKA ELECTRONICS CO., LTD.). The resulting mixture solution was placed into an evaporator, and the xylene solvent was removed at an atmospheric pressure of at least 4 hPa. Thereafter, an energy-curable resin 1a was prepared by passing through a 0.5 μm filter (SHPX-005-M25DKC: produced by ROKI TECHNO CO., LTD.).

The resin 1a was fired by using TGA (produced by PerkinElmer, Inc.) so as to quantify the amount of inorganic solid in the resin 1a. The result was 52.1% by weight.

The residual solvent (xylene) was measured using gas chromatography (5890 seriesII: produced by Hewlett-Packard Company) and was 0.002% by weight.

Regarding the refractive index, the sample was subjected to the measurement after being cured at 50 J and annealed at 80° C. for 72 hours. As a result, the refractive index ($n_g$, $n_F$, $n_e$, $n_d$, $n_c$)=(1.601, 1.589, 1.577, 1.570, 1.559) and ($v_d$, $\theta_{gF}$)=(19.1, 0.41).

The resin 2a was prepared as described below.

A thiol compound, a (meth)acrylic compound, and the like were prepared so as to obtain 100 parts by mass of resin 2a. In a bottle, 49.8 parts by mass of 4-mercapto-3,6-dithia-1,8-octanedithiol serving as a thiol compound, 28.4 parts by mass of tris(2-acryloxyethyl) isocyanurate serving as a (meth)acrylic compound, and 0.1 parts by mass of triethylamine were placed and mixed.

After the mixing, agitation was performed at 23° C. for 72 hours so as to adjust the viscosity. Thereafter, trimethylamine was removed by performing filtration through an adsorbent. Subsequently, 4.8 parts by mass of dicyclopentenyloxyethyl methacrylate, 22.9 parts by mass of tris(2-acryloxyethyl) isocyanurate, and 2.1 parts by mass of 1-hydroxycyclohexyl phenyl ketone were added and homogenously mixed so as to obtain the resin 2a.

Regarding the refractive index, the sample was subjected to the measurement after being cured at 50 J and annealed at 80° C. for 72 hours. As a result, the refractive index ($n_g$, $n_F$, $n_e$, $n_d$, $n_c$)=(1.635, 1.626, 1.619, 1.615, 1.611) and ($v_d$, $\theta_{gF}$)=(39.6, 0.59).

The modulus of elasticity at 23° C. of the resin portion 2 containing the resin 2a was 1.8 GPa.

The optical element 100 was produced by the manufacturing method illustrated in FIGS. 2A to 2E.

Initially, as illustrated in FIG. 2A, the uncured resin 1a was placed on the mold 12 having a diffraction grating shape. The base material 10 composed of glass having a thickness of 2 mm was placed on the resin 1a. Subsequently, a high-pressure mercury lamp (EXECURE250 produced by HOYA CANDEO OPTRONICS) serving as a light source 18 was used and irradiation was performed at an intensity of 14.2 mW/cm² to 20 mW/cm² for 2500 to 3,500 sec.

As illustrated in FIG. 2B, the mold 12 was released, and annealing was performed in air under the condition of 80° C. and 72 hours so as to form the resin portion 1 having a diffraction grating shape. The height of the grating apex 101 of the diffraction grating was 12.85 μm, the distance from the base material 10 to the grating valley 102 which is a base thickness of the diffraction grating was 3 μm, and the grating pitch was 200 μm.

As illustrated in FIG. 2C, the base material 10 provided with the resin portion 1 was held by a forming jig 16. The uncured resin 2a was dripped on the diffraction grating shape of the resin portion 1. Subsequently, as illustrated in FIG. 2D, the base material 11 that was a flat glass was placed on the resin 2a, and the resin 2a was extended so that the length of the resin portion 2 in the radial direction was made to be 300 μm from the edge portion of the resin portion 1 in the radial direction.

Finally, the sample was irradiated using a high-pressure mercury lamp (UL750: produced by HOYA CANDEO OPTRONICS) serving as a light source 60 from the base material 11 side under the condition of 20 mW/cm² (=illuminance through the quartz glass) for 2500 sec (50 J). The resin 2a was cured and annealed at 80° C. for 72 hours so as to obtain the resin portion 2 so that the optical element 100 was obtained. The thickness of the resin portion 2 was 50 μm from the grating apex of the resin portion 1.

The diffraction efficiency of the entire visible light region (wavelength: 435.8 nm to 656.3 nm) of the optical element 100 in Example 1 was 99% or more. The phase difference near the center was 15 nm.

Example 2

The resin 1a was prepared as described below.

Mixing of 39.31 g of fine particle dispersion liquid in which an indium tin oxide (ITO) was dispersed in a xylene solvent (average particle diameter of 15 nm, indium tin oxide concentration of 9.90% by weight, amount of dispersing agent of 2.07% by weight, and dispersing agent species: [high-molecular-weight dispersing agent] produced by CIK NanoTek Corporation) and 5.25 g of mixture of 20% by weight of tris(2-acryloxyethyl) isocyanurate, 25% by weight of pentaerythritol triacrylate, 40% by weight of dicyclopentenyloxyethyl methacrylate, 13% by weight of urethane-modified polyester acrylate, and 2% by weight of 1-hydroxycyclohexyl phenyl ketone, serving as an ultraviolet-curable acrylic resin, was performed.

The resulting mixture solution was placed into an evaporator, and the xylene solvent was removed at an atmospheric pressure of at least 4 hPa. Thereafter, an energy-curable resin 1b was prepared by passing through a 0.5 μm filter (SHPX-005-M25DKC: produced by ROKI TECHNO CO., LTD.). The energy-curable resin 1b was fired by using TGA (produced by PerkinElmer, Inc.) so as to quantify the amount of inorganic solid in the energy-curable resin 1b. The result was 39.31% by weight. The residual solvent (xylene) was measured using gas chromatography (5890 seriesII: produced by Hewlett-Packard Company) and was 0.001% by weight or less.

Regarding the refractive index, the sample was subjected to the measurement after being cured at 50 J and annealed at 80° C. for 72 hours. As a result, the refractive index ($n_g$, $n_F$, $n_e$, $n_d$, $n_c$)=(1.580, 1.570, 1.561, 1.555, 1.547) and ($v_d$, $\theta_{gF}$)=(24.1, 0.44).

The resin 2a was prepared as described below.

A thiol compound, a (meth)acrylic compound, and the like were prepared so as to obtain 100 parts by mass of resin 2a. In a bottle, 32.0 parts by mass of 4-mercapto-3,6-dithia-1,8-octanedithiol serving as a thiol compound, 18.8 parts by mass of tris(2-acryloxyethyl) isocyanurate serving as a (meth)acrylic compound, and 0.1 parts by mass of triethylamine were placed and mixed.

After the mixing, agitation was performed at 23° C. for 72 hours so as to adjust the viscosity. Thereafter, trimethylamine was removed by performing filtration through an adsorbent. Subsequently, 8.9 parts by mass of dicyclopentenyloxyethyl methacrylate, 37.2 parts by mass of tris(2-acryloxyethyl) isocyanurate, and 2.1 parts by mass of 1-hydroxycyclohexyl phenyl ketone were added and homogenously mixed so as to obtain the resin 2a.

Regarding the refractive index, the sample was subjected to the measurement after being cured at 50 J and annealed at 80° C. for 72 hours. As a result, the refractive index ($n_g$, $n_F$, $n_e$, $n_d$, $n_c$)=(1.602, 1.594, 1.587, 1.584, 1.580) and ($v_d$, $\theta_{gF}$)=(42.4, 0.58).

The modulus of elasticity at 23° C. of the resin portion 2 containing the resin 2a was 2.5 GPa.

The optical element 100 was produced by the method illustrated in FIGS. 2A to 2E in the same manner as in Example 1. In this regard, the resin portion 1 having a diffraction grating shape was formed. The height of the grating apex 101 of the diffraction grating was 20.0 μm, the distance from the base material 10 to the grating valley 102 which is a base thickness of the diffraction grating was 3 μm, and the grating pitch was 200 μm.

The thickness of the resin portion 2 in the optical element 100 was 50 μm from the grating apex of the resin portion 1.

The diffraction efficiency of the entire visible light region (wavelength: 435.8 nm to 656.3 nm) of the optical element 100 in Example 2 was 99% or more. The phase difference near the center was 30 nm.

Example 3

Regarding preparation of the resin 1a, the resin 1a akin to that in Example 2 was used.

The resin 2a was prepared as described below.

A thiol compound, a (meth)acrylic compound, and the like were prepared so as to obtain 100 parts by mass of resin 2a. In a bottle, 32.0 parts by mass of 4-mercapto-3,6-dithia-1,8-octanedithiol serving as a thiol compound, 18.8 parts by mass of tris(2-acryloxyethyl) isocyanurate serving as a (meth)acrylic compound, and 0.1 parts by mass of triethyl-amine were placed and mixed.

After the mixing, agitation was performed at 23° C. for 72 hours so as to adjust the viscosity. Thereafter, trimethylamine was removed by performing filtration through an adsorbent. Subsequently, 4.5 parts by mass of dicyclopentenyloxyethyl methacrylate, 41.7 parts by mass of tris(2-acryloxyethyl) isocyanurate, and 2.1 parts by mass of 1-hydroxycyclohexyl phenyl ketone were added and homogenously mixed so as to obtain the resin 2a.

Regarding the refractive index, the sample was subjected to the measurement after being cured at 50 J and annealed at 80° C. for 72 hours. As a result, the refractive index ($n_g$, $n_F$, $n_e$, $n_d$, $n_c$)=(1.602, 1.594, 1.587, 1.584, 1.580) and ($v_d$, $\theta_{gF}$)=(42.4, 0.58).

The modulus of elasticity at 23° C. of the resin portion 2 containing the resin 2a was 2.7 GPa.

The optical element 100 was produced by the method illustrated in FIGS. 2A to 2E in the same manner as in Example 1. In this regard, the resin portion 1 having a diffraction grating shape was formed. The height of the grating apex 101 of the diffraction grating was 20.0 μm, the distance from the base material 10 to the grating valley 102 which is a base thickness of the diffraction grating was 3 μm, and the grating pitch was 200 μm.

The thickness of the resin portion 2 in the optical element 100 was 50 μm from the grating apex of the resin portion 1.

The diffraction efficiency of the entire visible light region (wavelength: 435.8 nm to 656.3 nm) of the optical element 100 in Example 3 was 99% or more. The phase difference near the center was 18 nm.

Example 4

Regarding preparation of the resin 1a, the resin 1a akin to that in Example 2 was used.

The resin 2a was prepared as described below.

A thiol compound, a (meth)acrylic compound, and the like were prepared so as to obtain 100 parts by mass of resin 2a. In a bottle, 32.0 parts by mass of 4-mercapto-3,6-dithia-1,8-octanedithiol serving as a thiol compound, 18.8 parts by mass of tris(2-acryloxyethyl) isocyanurate serving as a (meth)acrylic compound, and 0.1 parts by mass of triethyl-amine were placed and mixed.

After the mixing, agitation was performed at 23° C. for 72 hours so as to adjust the viscosity. Thereafter, trimethylamine was removed by performing filtration through an adsorbent. Subsequently, 0 parts by mass of dicyclopentenyloxyethyl methacrylate, 46.1 parts by mass of tris(2-acryloxyethyl) isocyanurate, and 2.1 parts by mass of 1-hydroxycyclohexyl phenyl ketone were added and homogenously mixed so as to obtain the resin 2a.

Regarding the refractive index, the sample was subjected to the measurement after being cured at 50 J and annealed at 80° C. for 72 hours. As a result, the refractive index ($n_g$, $n_F$, $n_e$, $n_d$, $n_c$)=(1.602, 1.594, 1.587, 1.584, 1.580) and ($v_d$, $\theta_{gF}$)=(42.4, 0.58).

The modulus of elasticity at 23° C. of the resin portion 2 containing the resin 2a was 3.0 GPa.

The optical element 100 was produced by the method illustrated in FIGS. 2A to 2E in the same manner as in Example 1. In this regard, the resin portion 1 having a diffraction grating shape was formed. The height of the grating apex 101 of the diffraction grating was 20.0 μm, the distance from the base material 10 to the grating valley 102 which is a base thickness of the diffraction grating was 3 μm, and the grating pitch was 200 μm.

The thickness of the resin portion 2 in the optical element 100 was 50 μm from the grating apex of the resin portion 1.

The diffraction efficiency of the entire visible light region (wavelength: 435.8 nm to 656.3 nm) of the optical element 100 in Example 4 was 99% or more. The phase difference near the center was 20 nm.

Comparative Example 1

The resin 1b was prepared as described below.

Mixing of 52.07 g of fine particle dispersion liquid in which an indium tin oxide (ITO) was dispersed in a xylene solvent (average particle diameter of 15 nm, indium tin oxide concentration of 9.90% by weight, amount of dispersing agent of 2.07% by weight, and dispersing agent species: [high-molecular-weight dispersing agent] produced by CIK NanoTek Corporation) and 3.77 g of mixture of 20% by weight of tris(2-acryloxyethyl) isocyanurate, 25% by weight of pentaerythritol triacrylate, 40% by weight of dicyclopentenyloxyethyl methacrylate, 13% by weight of urethane-modified polyester acrylate, and 2% by weight of 1-hydroxycyclohexyl phenyl ketone, serving as an ultraviolet-curable acrylic resin, was performed.

The resulting mixture solution was placed into an evaporator, and the xylene solvent was removed at an atmospheric pressure of at least 4 hPa. Thereafter, an energy-curable resin 1b was prepared by passing through a 0.5 μm filter (SHPX M25DKC: produced by ROKI TECHNO CO., LTD.).

The resin 1b was fired by using TGA (produced by PerkinElmer, Inc.) so as to quantify the amount of inorganic solid in the resin 1b. The result was 51.55% by weight.

The residual solvent (xylene) was measured using gas chromatography (5890 seriesII: produced by Hewlett-Packard Company) and was 0.001% by weight or less.

Regarding the refractive index, the sample was subjected to the measurement after being cured at 50 J and annealed at 80° C. for 72 hours. As a result, the refractive index ($n_g$, $n_F$, $n_e$, $n_d$, $n_c$)=(1.600, 1.588, 1.576, 1.569, 1.558) and ($v_d$, $\theta_{gF}$)=(19.3, 0.41).

The resin 2b was prepared as described below.

Preparation of 47.48 g of dispersion liquid in which zirconium oxide was dispersed in a methanol solvent (produced by Sakai Chemical Industry Co., Ltd.; average particle diameter of metal oxide particles of 5 nm and zirconium oxide concentration of 31.2% by mass) was performed.

In this regard, 5.04 g ω-carboxy-polycaprolactone mono-acrylate (M-5300: produced by TOAGOSEI Co., Ltd.) was prepared as a dispersing agent. In addition, 4.08 g of tris(2-acryloxyethyl) isocyanurate, 0.70 g of pentaerythritol triacrylate, and 5.74 g of dicyclopentenyloxyethyl methacrylate were prepared as an ultraviolet-curable resin. Further, 0.33 g of 1-hydroxycyclohexyl phenyl ketone was used as a photopolymerization initiator, and these were placed in a bottle and mixed.

The mixture liquid was treated using an ultrasonic cleaner (BRANSON 1210: produced by Emerson Japan, Ltd.) for 30 min, and, thereafter, aggregates were removed using a syringe filter (PTFE: 0.8 μm and 0.2 μm). Subsequently, the mixture solution was subjected to vacuum concentration by using an evaporator while being heated in an oil bath at 41° C. so as to remove methanol serving as a solvent so that the resin $2b$ was obtained.

Regarding the refractive index, the sample was subjected to the measurement after being cured at 50 J and annealed at 80° C. for 72 hours. As a result, the refractive index ($n_g$, $n_F$, $n_e$, $n_d$, $n_c$)=(1.637, 1.629, 1.622, 1.619, 1.615) and ($v_d$, $\theta_{gF}$)=(45.0, 0.57).

The modulus of elasticity at 23° C. of the resin portion $2$ containing the resin $2b$ was 4.0 GPa.

The optical element $100$ was produced by the method illustrated in FIGS. 2A to 2E in the same manner as in Example 1. In this regard, the resin portion $1$ having a diffraction grating shape was formed. The height of the grating apex $101$ of the diffraction grating was 10.2 μm, the distance from the base material $10$ to the grating valley $102$ which is a base thickness of the diffraction grating was 3 μm, and the grating pitch was 200 μm.

The thickness of the resin portion $2$ in the optical element $100$ was 50 μm from the grating apex of the resin portion $1$.

The diffraction efficiency of the entire visible light region (wavelength: 435.8 nm to 656.3 nm) of the optical element $100$ in Comparative example 1 was 99% or more. The phase difference near the center was 60 nm.

FIG. $4$ presents the evaluation results of Examples 1 to 4 and Comparative example 1. In Examples 1 to 4, since the modulus of elasticity was set to be 0.1 GPa or more and 3.0 GPa or less at 22° C. or higher and 24° C. or lower, the diffraction efficiency of 99% or more was maintained and a phase difference near the center due to refractive index variations was able to be reduced. However, in Comparative example 1, since the modulus of elasticity of the resin portion $2$ was more than 3.0 GPa at 22° C. or higher and 24° C. or lower, a phase difference near the center due to refractive index variations was unable to be reduced. Consequently, high-concentration ring variations occurred during de-focusing.

Second Embodiment

FIG. $5$ illustrates an imaging apparatus $600$ as an example of an apparatus including the optical element $100$ according to the present embodiment. In FIG. $5$, a camera main body $602$ is connected to a lens barrel $601$ serving as the optical equipment, and an interchangeable lens capable of being attached to and detached from the camera main body $602$ is suitable for the lens barrel $601$.

The light from a subject passes through an optical system composed of a plurality of lenses $603$, $605$, and the like arranged on an optical axis of an imaging optical system in a housing $620$ of the lens barrel $601$ and is received by an imaging element $610$. The light received by the imaging element $610$ is light in the visible light region (wavelength: 300 nm or more and 800 nm or less). The optical element $100$ according to the present embodiment may be used for, for example, the lens $605$ and may be used for lenses other than the lens $605$. In addition, the optical element $100$ may be applied to various lenses, such as lenses of printers, lenses of microscopes, eyeglasses, and contact lenses.

In this regard, the lens $605$ is supported by an inner cylinder $604$ in the housing and is movably supported relative to an outer cylinder of the lens barrel $601$ for the sake of facilitating focusing and zooming. Regarding the size of the lens $605$, the diameter can be 40 mm or more and 60 mm or less.

During an observation period before imaging, the light from the subject is reflected by a main mirror $607$ in a housing $621$ of the camera main body and passes through a prism $611$, and image to be imaged is projected onto a cameraperson through a finder lens $612$. The main mirror $607$ is, for example, a half mirror, and the light passed through the main mirror $607$ is reflected by a sub-mirror $608$ in the direction of an autofocus (AF) unit $613$. The reflected light is used for, for example, distance measurement. In this regard, the main mirror $607$ attached, by bonding or the like, to and supported by a main mirror holder $640$. When imaging is performed, through a driving mechanism not illustrated in the drawing, the main mirror $607$ and the sub-mirror $608$ are moved to the outside of the optical path, a shutter $609$ is opened, and an imaged image incident from the lens barrel $601$ is focused on the imaging element $610$. In this regard, a diaphragm $606$ is configured to be able to change the brightness and the depth of focus during imaging by changing the aperture area.

The above-described embodiment is appropriately changeable within the bound of not departing from the technical scope.

For example, a plurality of embodiments may be combined. In addition, a portion of the items of at least one embodiment may be deleted or replaced.

A new item may be added to at least one embodiment. The contents disclosed in the present specification include not only items clearly described in the present specification but also all items that may be grasped from the present specification and drawings attached to the present specification.

In addition, the contents disclosed in the present specification includes the complementary set of an individual concept described in the present specification. That is, for example, when there is a description "A is larger than B" in the present specification, even if a description "A is not larger than B" is omitted, it can be said that the present specification discloses "A is not larger than B". This is because in an instance in which "A is larger than B" is described, it is provided that an instance in which "A is not larger than B" is taken into consideration.

A technology advantageous for reducing refractive index variations while maintaining a diffraction efficiency is provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-168216 filed Oct. 13, 2021, which is hereby incorporated by reference herein in its entirety.

What is claimed is:

1. An optical element comprising:
a first optical layer;
a second optical layer; and
a transparent base material, the first optical layer being disposed between the second optical layer and the transparent base material and a diffraction grating being disposed at the interface between the first optical layer and the second optical layer, wherein the refractive index of the d-line of the second optical layer is higher than the refractive index of the d-line of the first optical layer, the Abbe number of the second optical layer is higher than the Abbe number of the first optical layer, the first optical layer is composed of a first resin and inorganic particles dispersed in the first resin, and the second optical layer is composed of a second resin having a modulus of elasticity of 0.1 GPa or more and 3.0 GPa or less at 22° C. or higher and 24° C. or lower, wherein the second resin is an ene-thiol-based resin, wherein the inorganic particles dispersed in the first resin are composed of an indium tin compound that is a transparent electroconductive substance, and have an average primary particle diameter of 3 nm to 20 nm.

2. The optical element according to claim 1, wherein the refractive index of the first optical layer is 1.54 or more and 1.58 or less.

3. The optical element according to claim 1, wherein the second resin has a modulus of elasticity of 0.1 GPa or more and 2.5 GPa or less at 22° C. or higher and 24° C. or lower.

4. The optical element according to claim 1, wherein the Abbe number of the first optical layer is 19 or more and 28 or less.

5. The optical element according to claim 1, wherein the Abbe number of the first optical layer is an Abbe number at 435.8 nm to 656.3 nm.

6. The optical element according to claim 1, wherein a difference between the refractive index of the first optical layer and the refractive index of the second optical layer is 0.027 or more and 0.047 or less.

7. The optical element according to claim 1, wherein the second optical layer is bonded to the first optical layer and a transparent base material different from the transparent base material and disposed by bonding between the first optical layer and the transparent base material different from the transparent base material.

8. The optical element according to claim 1, wherein a length from a grating apex of the first optical layer to a grating valley adjoining the grating apex is 1 μm or more and 30 μm or less.

9. The optical element according to claim 8, wherein the length is smaller than a thickness of the second optical layer.

10. The optical element according to claim 1, wherein the thickness of the second optical layer is 20 μm or more and 80 μm or less.

11. Optical equipment comprising:
a housing; and
a lens provided with the optical element according to claim 1 in the interior of the housing.

12. The optical equipment according to claim 11, wherein the lens is 40 mm or more and 60 mm or less in size.

13. An imaging apparatus comprising:
the optical equipment according to claim 11; and
an imaging element for receiving light passed through the optical equipment.

* * * * *